US007045066B2

(12) United States Patent
Lee et al.

(10) Patent No.: US 7,045,066 B2
(45) Date of Patent: May 16, 2006

(54) METHOD OF ARSENIC IMMOBILIZATION IN CRYSTALLINE FORM FROM WATER

(75) Inventors: Mao-Sung Lee, Hsinchu (TW); Wang-Kuan Chang, Hsinchu (TW); Chihpin Huang, Hsinchu (TW); Shih-Ming Yen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 84 days.

(21) Appl. No.: 10/739,073

(22) Filed: Dec. 19, 2003

(65) Prior Publication Data

US 2004/0222162 A1 Nov. 11, 2004

(30) Foreign Application Priority Data

May 7, 2003 (TW) .............................. 92112487 A

(51) Int. Cl.
*C02F 1/58* (2006.01)

(52) U.S. Cl. ...................... 210/715; 210/638; 210/639; 210/724; 210/911; 423/87; 423/561.1

(58) Field of Classification Search ................ 210/638, 210/639, 661, 714, 715, 724, 726, 911; 423/87, 423/561.1
See application file for complete search history.

(56) References Cited

U.S. PATENT DOCUMENTS

| | | | | |
|---|---|---|---|---|
| 4,566,975 | A * | 1/1986 | Allgulin | 210/711 |
| 4,861,493 | A * | 8/1989 | Jansen | 210/715 |
| 5,114,592 | A * | 5/1992 | Schuster et al. | 210/667 |
| 5,262,063 | A * | 11/1993 | Yen | 210/724 |
| 5,348,662 | A * | 9/1994 | Yen et al. | 210/717 |
| 5,635,073 | A * | 6/1997 | Aktor et al. | 210/714 |
| 6,248,241 | B1 * | 6/2001 | Christensen et al. | 210/715 |

* cited by examiner

*Primary Examiner*—Peter A. Hruskoci
(74) *Attorney, Agent, or Firm*—Bacon & Thomas, PLLC

(57) ABSTRACT

A method of removing arsenic from water by using a reactor that is provided with a fluidized bed of carriers is disclosed. An arsenic-containing influent is mixed in the reactor with a sulfide aqueous solution or metallic salt aqueous solution at a predetermined pH, thereby resulting in formation of crystals of arsenic sulfides or arsenic acid metal salts. The arsenic contained in the influent is thus removed by crystallization. An effluent with a reduced arsenic content is discharged from the reactor. The carriers, on which the crystals are formed, are periodically removed from the reactor which is replenished with fresh carriers immediately after.

13 Claims, 1 Drawing Sheet

METHOD OF ARSENIC IMMOBILIZATION IN CRYSTALLINE FORM FROM WATER

FIELD OF THE INVENTION

This invention relates generally to a method of removing arsenic from water, and more particularly to a method of removing arsenic from water by means of fluidized bed crystallization.

BACKGROUND OF THE INVENTION

Gallium arsenates have been widely used in the manufacturing of communication and LED optical electronics products. Hydrogen arsenate gas is one of the compounds that chemical vapor deposition (CVD) process used. Wastewater containing soluble arsenic is generated due to waste gas wash by scrubbers. Currently, the conventional precipitation method is able to treat wastewater containing arsenic. However, it generates a large amount of hazardous sludge, which cannot be disposed of easily and economically; and a wastewater containing arsenic in excess of 10 mg/L, which is much higher than the regulated effluent concentration of 0.5 mg/L. It is, therefore, readily apparent that the development of an environmentally friendly method of treating the arsenic-containing wastewater is urgently called for.

U.S. Pat. No. 4,861,493 discloses a process for the removal of metals, in particular heavy metals, from the wastewater in the form of their sulfides by mixing the wastewater with a water-soluble sulfide. According to the invention the metal-containing wastewater is thoroughly mixed with the water-soluble sulfide at a suitable pH in a reactor of the fluidized bed type provided with an appropriate bed material, on which the metal sulfide crystallizes out, whereby the thus obtained bed material covered with crystalline metal sulfide is removed from the reactor and new bed material is added to the reactor from time to time. Usually as water-soluble sulfide, an alkali metal sulfide, alkali metal hydrogen sulfide, ammonium sulfide or ferrous sulfide is used, whereas the use of sodium sulfide, sodium hydrogen sulfide, potassium sulfide or potassium hydrogen sulfide is preferred. According to this prior art process, the following metals: Ni, Sr, Zn, Cu, Fe, Ag, Pb, Cd, Hg, Co, Mn, Te, Sn, In, Bi or Sb may be removed. However, only Hg was removed from water at a pH value of 4–10 as shown in the examples disclosed in this prior art.

U.S. Pat. No. 5,348,662 discloses a process of removing heavy metals (arsenic, tin and lead) from aqueous solutions (groundwater) by precipitation of a salt thereof, wherein an oxidizing agent (ozone, hydrogen peroxide, sulfuric acid, nitric acid or hydrochloric acid) is optionally used to increase the valence of said metal, and a precipitation-enhancing agent (calcium sulfate, arsenic trioxide, calcium arsenate or cupric oxide) is added to maximize particle size of the precipitate and to facilitate its separation from said solution. This prior art process will generate sludge with water content of 60–80%, which is not only bulky but also difficult to be resourced due to various contaminations contained therein.

SUMMARY OF THE INVENTION

The method disclosed here may be used to remove arsenic from water in crystalline form, which is free from the shortcomings of the conventional methods described above.

A method of removing arsenic from water disclosed in the present invention comprises mixing an arsenic-containing water with a aqueous solution of a water-soluble sulfide or a metal salt at a predetermined pH in a reactor having a fluidized bed of carriers, so that arsenic sulfides or metal arsenate crystallize out on the carriers and that a treated water with a reduced amount of arsenic is obtained; separating the treated water from the reactor; and removing the carriers having the resulting crystals thereon from the reactor.

Preferably, the arsenic-containing water contains trivalent arsenic ions; wherein the arsenic-containing water is mixed with the aqueous solution of the water-soluble sulfide at pH below 4, thereby resulting in formation of crystals of AsS or $As_2S_3$ on the carriers. More preferably, the pH is of 0.8–1.2, and the arsenic-containing water is mixed with the aqueous solution of the water-soluble sulfide under a circumstance that a mole ratio of sulfur to arsenic ranges from 1:1 to 3:1. Suitable sulfides for use in the method of the present invention include but is not limited to alkali metal sulfide, alkaline earth metal sulfide, ammonium sulfide, ferrous sulfide (FeS), hydrogen sulfide, and sulfur dioxide, for examples, sodium sulfide, sodium hydrogen sulfide, potassium sulfide, and potassium hydrogen sulfide.

Preferably, the arsenic-containing water contains pentavalent arsenic ions; wherein the arsenic-containing water is mixed with the aqueous solution of the metal salt at pH greater than 7, thereby resulting in formation of crystal of $M_x(AsO_4)_y(OH)_z$ on the carriers, with M being the metal contained in the metal salt and M having a valence of m, and $mx-3y-z=0$, where $x>0$, $y>0$, and $z\geqq 0$. More preferably, the metal M is calcium, the pH is of 11 to 13, $x=5$, $y=3$ and $z=1$. Further, the arsenic-containing water is mixed with the aqueous solution of the metal salt preferably under a circumstance that a product of the M metal concentration and $AsO_4^{3-}$ concentration is greater than the solubility product of the crystal.

Preferably, the carriers are sand. More preferably, the sand has a diameter ranging from 0.1 to 0.5 mm.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations like reference numerals refer to like elements, and in which.

DETAILED DESCRIPTION OF THE PREFERRED EMBODIMENTS

Figure 1:
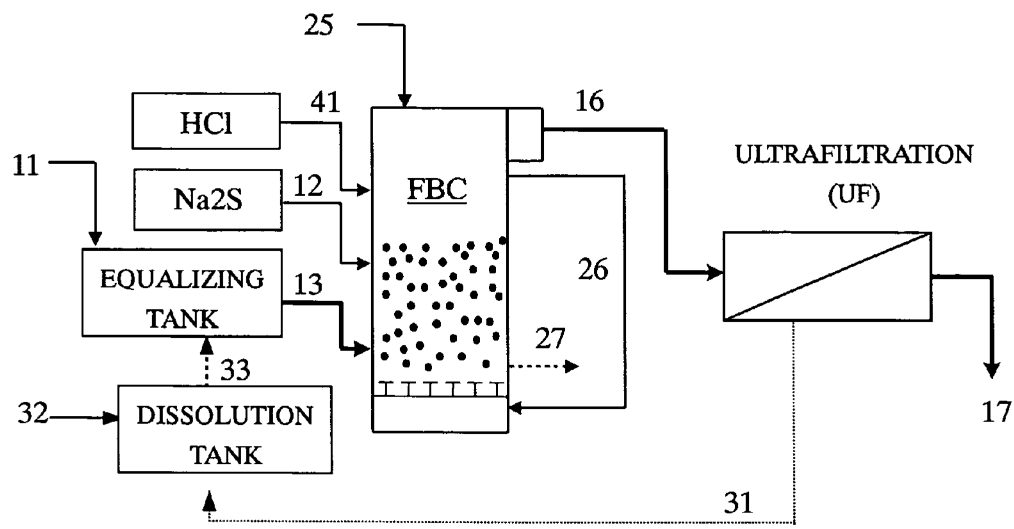
FIG. 1 is the perspective view schematically illustrating the first preferred embodiment of the invention.

The method of the invention makes use of a reactor containing a fluidized bed of carriers. An arsenic-containing water is first introduced into the reactor. In the meantime, a water-soluble sulfide or calcium salt or another metal salt is introduced into the reactor, thereby resulting in the formation of crystals of arsenic sulfide or metallic arsenate on the carriers. Such a treated water contains arsenic in a relatively lower concentration and is discharge from the reactor for a second treatment. The follow-up treatment processes include a gravity settling, membrane filtration, or coagulation/sedimentation, thereby producing a further treated discharge water, which contains arsenic in a concentration allowable by law. In the event that a concentrated waste or wastewater containing nuclei is formed in the second treatment, the concentrated waste or wastewater is treated in a dissolution tank by adding an acid or alkali to dissolve the nuclei, and is then recycled to the reactor. The concentrated waste or wastewater may be allowed to bypass the dissolution tank in the recycling.

After fluidized bed reactor, the effluent may be treated with methods of adsorption, ion exchange, ion flotation, electro-coagulation, or extraction processes, thereby resulting in a further reduction in quantity for arsenic.

It must be noted here that the carriers, on which the crystals are formed, are periodically removed from the reactor, and the reactor is periodically replenished with fresh carriers.

In the first embodiment of this invention, the arsenic is removed in crystal forms of arsenic sulfides, such as $As_2S_3$, AsS and $As_2S_5$, during the first treatment. The inventors of this invention have discovered that factors such as S/As mole ratio, volumetric loading (kg/$m^2$.H), pH value, and As concentration in the influent are critical in the crystallization, in which the effect of pH value appears to be most profound on the crystallization, based on the water quality of the effluent.

According to the data listed in Table 1, the effective removal of arsenic takes place at the time when pH value is less then 4. When pH value is 3.6, the ratio of crystallization is 15%. When pH value is 2, the ratio of crystallization increases to 71%. When pH value is 1, the ratio of crystallization is as high as 93%. When pH value is increased to 7.2, the separation and the dissolution of crystals can be observed by the naked eye. It is therefore readily apparent that the optimal pH value of crystallization is 1.0±0.2. The S/As mole ratio is next to the pH value in terms of its effect on crystallization. The results indicate that optimal ratio is 2.0.

TABLE 1

Experimental data of removal of arsenic from water

| Experimental conditions | | | Experimental results | | |
|---|---|---|---|---|---|
| As conc. in influent (mg/L) | pH | S/As (mol/mol) | As conc. in the effluent from the first treatment (mg/L) | As conc. in the effluent from the second treatment (mg/L) | Ratio of crystallization (%) |
| 611 | 1.0 | 2.0 | 7.2 | 0.5 | 93 |
| 734 | 2.0 | 2.0 | 36.0 | 0.4 | 71 |
| 1,182 | 3.6 | 2.0 | 100.6 | 10.0 | 15 |
| 250 | 7.2 | 2.0 | 107.5* | 14.1 | −16 |

*due to dilution effect

In the second embodiment of the invention, arsenic is removed from water in the form of crystals of metallic arsenates or arsenate compounds having a very low solubility in water, as shown in Table 2, by adding a water-soluble metal salt or compound.

TABLE 2

Partial listing of solubility products, Ksp, of arsenic compounds and arsenates compounds having a low solubility

| Compounds | Ksp |
|---|---|
| $Ag_3AsO_3$ | $4.5 \times 10^{-19}$ |
| $Ag_3AsO_4$ | $1.1 \times 10^{-20}$ |
| $Ca_3(AsO_4)_2$ | $6.0 \times 10^{-19}$ |
| $Ca_5(AsO_4)_3(OH)$ | $9.1 \times 10^{-39}$ |
| $Sr_3(AsO_4)_2$ | $1.6 \times 10^{-18}$ |
| $Mg_3(AsO_4)_2$ | $2.1 \times 10^{-20}$ |
| $Ni_3(AsO_4)_2$ | $3.0 \times 10^{-26}$ |
| $Zn_3(AsO_4)_2$ | $1.6 \times 10^{-28}$ |
| $Co_3(AsO_4)_2$ | $8.0 \times 10^{-29}$ |
| $Mn_3(AsO_4)_2$ | $2.0 \times 10^{-29}$ |
| $Cd_3(AsO_4)_2$ | $2.0 \times 10^{-33}$ |
| $Pb_3(AsO_4)_2$ | $4.1 \times 10^{-36}$ |
| $Cu_3(AsO_4)_2$ | $8.0 \times 10^{-36}$ |
| $Ba_3(AsO_4)_2$ | $7.7 \times 10^{-51}$ |
| $FeAsO_4$ | $1.0 \times 10^{-20}$ |
| $CrAsO_4$ | $7.8 \times 10^{-21}$ |
| $AlAsO_4$ | $1.6 \times 10^{-16}$ |
| $As_2S_3$ | $4.0 \times 10^{-29}$ |
| $BiAsO_4$ | $4.4 \times 10^{-10}$ |
| $UO_2HAsO_4$ | $3.2 \times 10^{-11}$ |
| $NH_4UO_2AsO_4$ | $1.7 \times 10^{-24}$ |
| $KUO_2AsO_4$ | $2.5 \times 10^{-23}$ |
| $NaUO_2AsO_4$ | $1.3 \times 10^{-22}$ |

The arsenates listed in Table 2 contain respectively such metallic elements as silver (Ag), calcium (Ca), strontium (Sr), magnesium (Mg), nickel (Ni), zinc (Zn), cobalt (Co), manganese (Mn), cadmium (Cd), lead (Pb), copper (Cu), barium (Ba), iron (Fe), chromium (Cr), aluminium (Al), and bismuth (Bi). More than that, arsenate compounds also include $UO_2HAsO_4$, $KUO_2AsO_4$, and $NaUO_2AsO_4$.

The features and the advantages of the present invention will be more readily understood upon a thoughtful deliberation of the following detailed description of two preferred embodiments of the invention with reference to the accompanying drawings.

As shown in FIG. 1, the method embodied in the present invention made use of a fluidized bed crystallization reactor (FBC) having a diameter of 2 cm and a height of 160 cm. The reactor contained silica sand serving as carriers 25. The grains of the silica sand had a diameter ranging from 0.2 to 0.5 mm. When the reactor had been filled with water, a recycled water 26 was started to fluidized the carriers 25. A simulated wastewater 11 prepared from $NaAsO_2$ having 611 mg $As^{3+}$/L was stored in an equalizing tank. An equalized wastewater 13 was introduced from the equalizing tank at a flow of 5 ml/mim into the FBC reactor. A water-soluble sodium sulfide reagent 12 was also introduced at a flow of 27 ml/min into the FBC reactor, with the sulfur concentration being 100 mg/L. The mole ratio of sulfur ion and arsenic ion in the reactor was 2:1. The pH value and the oxidation-reduction potential (ORP) of the mixture solution in the FBC reactor were monitored. The adding of hydrochloric acid 41 was controlled on-line by a pH controller such that the pH value of the mixture solution was kept at 1.0±0.2. In the meantime, the ORP value was 315–325 mV. As a result of the reaction taking place in the reactor for a period of time, yellow crystals were formed on the carriers 25. The yellow crystals became orange crystals on the heels of a further reaction. As the diameter of the crystals had reached between 1 and 3 mm, the carriers 27 were taken out of the reactor. The reactor was then replenished with the fresh carriers 25. As a result, the first treatment water 16 was obtained. A sample of the first treatment water 16 was drawn and added with an alkali to dissolve any solids suspended in the sample prior to the measurement of the arsenic ion concentration. The arsenic ion concentration measured was 7.2 mg As/L. When the orange crystals had been dissolved by an alkali, the arsenic mixture of the resulting solution was analyzed by an inductive coupling plasma-Auger spectroscopy, ICP-AES Analysis, and the sulfur quantitative analysis was done by chromatography. The mole ratio of the sulfur and the arsenic was 1.16:1. The orange crystals were assumed to be a mixed arsenic sulfides including realgar (AsS) and orpiment ($As_2S_3$).

The first treatment water 16 was further treated with an ultrafiltration membrane (UF), so as to become the second treatment water 17. The sample of the second treatment water 17 was analyzed. The arsenic ion concentration of the second treatment water 17 was 0.5 mg/L. The second treatment water 17 can be either recycled or discharged. With the pH value remaining unchanged, the S/As mole ratio was increased to 2.2 from 2.0. The arsenic ion concentration of the second treatment water 17 was reduced to 0.22 mg As/L. The nuclei-containing water 31 retained by the ultrafiltration membrane was conveyed to a dissolution tank, in which the nuclei were dissolved by sodium hydroxide (32), thereby resulting in formation of a wastewater 33 which was transferred to the equalizing tank for recycling to the FBC reactor.

According to the mass balance computation, the ratios of arsenic crystallization, arsenic precipitation, and arsenic dissolution of the method of the first preferred embodiment of the present invention are respectively 92.7%, 6.8%, and 0.5% under the condition that pH value remains at 1.0±0.2.

Figure 2:
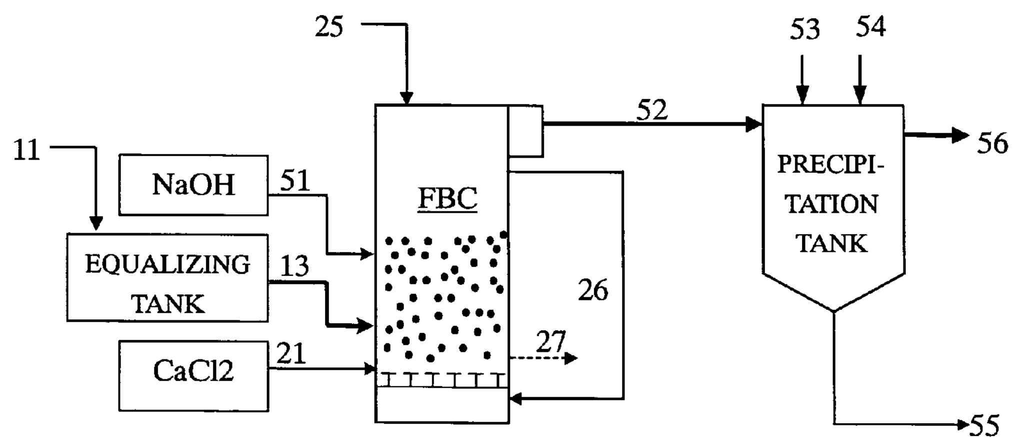
FIG. 2 is the perspective view schematically illustrating the second preferred embodiment of the invention.

As shown in FIG. 2, a method of the second preferred embodiment of the present invention made use of a reactor which is similar in construction to that of the first preferred embodiment described above, wherein like parts are represented by like numerals. A pentavalent arsenic simulated wastewater 11 prepared from $Na_2HAsO_4.7H_2O$ with a concentration of 302 mg As/L was stored in the equalizing tank, from which an arsenic wastewater stream 13 was introduced at a flow rate of 4 ml/min into the FBC reactor containing carriers 25. In the meantime, a soluble calcium chloride reagent 21 was introduced at a flow rate of 11 ml/min into the FBC reactor, with the calcium ion concentration being 250 mg/L. The mole ratio of the calcium and arsenic in the reactor was 2.5:1. The adding of sodium hydroxide 51 was controlled on-line by a pH controller such that the pH value of the mixture solution in the FBC reactor was kept at 12. After a period of reaction taking place in the FBC reactor, white crystals were formed on the carriers. As the white crystals had grown to have a diameter ranging from 1 to 3 mm, the carriers 27 were sampled out of the FBC reactor. Meanwhile, the FBC reactor was replenished with fresh carriers 25. As a result of the treatment described above, the first treatment water 52 was attained. The sample of the first treatment water 52 was provided with an acid to dissolve any solids suspended therein. The total arsenic ion concentration measured was 22 mg As/L. A qualitative analysis of the white crystals was done by X-ray diffraction (XRD). The white crystals were identified as crystals of $Ca_5(AsO_4)_3(OH)$ by comparing the standard values of the standard sample, with the measured spacing of planes d values being 2.81 Å, 1.99 Å, 3.49 Å, with the measured relative light intensity $I/I_0$ being 100, 50, and 41; and with the measured diffraction angle 2. being 31.8°, 45.5°, 25.5°.

The first treatment water 52 was introduced into a precipitation tank, to which ferric chloride 53 was added, with Fe/As mole ratio being 6, and hydrochloric acid 54 was added to adjust the pH value to 5.5. As a result of the coagulation operation, the second treatment water 56 was obtained. According to the sample analysis, the arsenic ion concentration of the second treatment water 56 was 0.4 mg/L. The second treatment water 56 was thus allowed to be recycled or discharged. The precipitated sludge 55 was treated with the conventional sludge disposing method.

The embodiments of the present invention described above are merely illustrative and nonrestrictive. Accordingly, the present invention may be embodied in other specific forms without deviating from the spirit thereof. The present invention is therefore to be limited only by the scopes of the following claims.

What is claimed is:

1. A method of removing arsenic from water, said method comprising mixing an arsenic-containing water with a aqueous solution of a water-soluble sulfide in a reactor having a fluidized bed of carriers, wherein the arsenic-containing water is mixed with the aqueous solution of the water-soluble sulfide at pH below 4, so that arsenic sulfides crystallize out on the carriers and that a treated water with a reduced amount of arsenic is obtained; separating the treated water from the reactor; and removing the carriers having the resulting crystals thereon from the reactor.

2. The method as defined in claim 1, wherein the arsenic-containing water contains trivalent arsenic ions; wherein the arsenic-containing water is mixed with the aqueous solution of the water-soluble sulfide at pH below 4, thereby resulting in formation of crystals of AsS or $As_2S_3$ on the carriers.

3. The method as defined in claim 2, wherein the pH is of 0.8–1.2.

4. The method as defined in claim 2, wherein the arsenic-containing water is mixed with the aqueous solution of the water-soluble sulfide under a circumstance that a mole ratio of sulfur to arsenic ranges from 1:1 to 3:1.

5. The method as defined in claim 2, wherein the sulfide is an alkali metal sulfide, alkaline earth metal sulfide, ammonium sulfide, ferrous sulfide (FeS), hydrogen sulfide, or sulfur dioxide.

6. The method as defined in claim 5, wherein the sulfide is sodium sulfide, sodium hydrogen sulfide, potassium sulfide, or potassium hydrogen sulfide.

7. The method as defined in claim 1, wherein the carriers are sand.

8. The method as defined in claim 7, wherein the sand has a diameter ranging from 0.1 to 0.5 mm.

9. A method of removing arsenic from water, said method comprising mixing an arsenic-containing water with a aqueous solution of a calcium salt at a predetermined pH in a reactor having a fluidized bed of carriers; forming crystal of metal arsenate on the carriers by mixing the arsenic-containing water with the aqueous solution of the calcium salt under a circumstance that a product of metal ion concentration and $AsO_4^{3-}$concentration is greater than the solubility product of the crystal, so that a treated water with a reduced amount of arsenic is obtained; separating the treated water from the reactor; and removing the carriers having the resulting crystals thereon from the reactor.

10. The method as defined in claim 9, wherein the arsenic-containing water contains pentavalent arsenic ions; wherein the arsenic-containing water is mixed with the aqueous solution of the calcium salt at pH greater than 7, thereby resulting in formation of crystal of $M_x(AsO_4)_y(OH)_z$ on the carriers, with M being the metal contained in the calcium salt and M having a valence of m, and $mx-3y-z=0$, where $x>0$, $y>0$, and $z\geqq0$.

11. The method as defined in claim 10, wherein the pH is of 11 to 13, x=5, y=3 and z=1.

12. The method as defined in claim 9, wherein the carriers are sand.

13. The method as defined in claim 12, wherein the sand has a diameter ranging from 0.1 to 0.5 mm.

* * * * *